United States Patent [19]

Takeshima

[11] Patent Number: 5,315,824
[45] Date of Patent: May 31, 1994

[54] COLD HC ADSORPTION AND REMOVAL APPARATUS FOR AN INTERNAL COMBUSTION ENGINE

[75] Inventor: Shinichi Takeshima, Susono, Japan

[73] Assignee: Toyota Jidosha Kabushiki Kaisha, Aichi, Japan

[21] Appl. No.: 936,966

[22] Filed: Aug. 28, 1992

[30] Foreign Application Priority Data

Aug. 29, 1991 [JP] Japan ................................. 3-242460

[51] Int. Cl.$^5$ .............................................. F01N 3/28
[52] U.S. Cl. ............................ 60/297; 60/288; 60/300; 422/169; 422/170; 422/174
[58] Field of Search ................ 60/297, 288, 274, 300; 422/169, 170, 174; 423/212, 213.5

[56] References Cited

U.S. PATENT DOCUMENTS 5,125,231 6/1992 Patil ........................................ 60/297

FOREIGN PATENT DOCUMENTS 189309 8/1987 Japan ..................................... 60/297
257710 10/1989 Japan ..................................... 60/297
2-135126 5/1990 Japan .

*Primary Examiner*—Douglas Hart
*Attorney, Agent, or Firm*—Kenyon & Kenyon

[57] ABSTRACT

An HC adsorbent and a first three-way or oxidation catalyst are installed in an exhaust conduit of an internal combustion engine in that order in a flow direction. A second three-way or oxidation catalyst is installed upstream of the HC adsorbent in the exhaust conduit. When the exhaust gas flows through the second catalyst, the thermal energy of the exhaust gas is compensated for warming-up the second catalyst in a cold period. As a result, the warming-up of the HC adsorbent is delayed and the HC adsorbent can adsorb the HC included in the exhaust gas for a relatively long period. After the second catalyst has been warmed-up, the HC included in the exhaust gas flowing into the HC adsorbent is oxidized. As a result, the HC adsorbent is prevented from being saturated for a short period of time.

14 Claims, 6 Drawing Sheets

COLD HC ADSORPTION AND REMOVAL APPARATUS FOR AN INTERNAL COMBUSTION ENGINE

BACKGROUND OF THE INVENTION

1. Field of the Invention

The present invention relates to an apparatus for adsorbing and removing hydrocarbons included in exhaust gas from an internal combustion engine during a cold period immediately after engine start during which a three-way or oxidation catalyst installed in the exhaust conduit has not yet been warmed-up and activated.

2. Description of the Prior Art

Hydrocarbons (HC), carbon monoxide (CO), and nitrogen oxides (NOx) included in the exhaust gas from an internal combustion engine are purified usually by a three-way catalyst installed in an exhaust conduit of the internal combustion engine. However, during a cold period immediately after engine start, when the three-way or oxidation catalyst has not yet been warmed-up to temperatures above the activation temperature (in a range about 250° C.–300° C.), it cannot purify the HC of the cold period (cold HC) and CO included in the exhaust gas, though the cold HC occupies a main portion of the total amount of HC exhausted from the engine to atmosphere.

To prevent the cold HC from being exhausted to atmosphere, Japanese Patent Publication 2-135126 proposes a cold HC adsorption and removal apparatus, in which an HC adsorbent is installed upstream of the three-way or oxidation catalyst in the exhaust conduit of the internal combustion engine. The HC adsorbent includes zeolite coated onto a monolithic cordierite carrier and at least one kind of catalyst metal carried by the carrier. Since zeolite has a characteristic of adsorbing HC at relatively low temperatures (below about 90° C.) and releasing the adsorbed HC at relatively high temperatures, HC included in the exhaust gas during a cold period is adsorbed by the HC adsorbent. After the exhaust gas temperature has risen and the three-way or oxidation catalyst has been activated, the HC released from the HC adsorbent flows to the three-way or oxidation catalyst located downstream of the HC adsorbent and is purified by the three-way or oxidation catalyst. The HC released from the HC adsorbent at temperatures between the HC release beginning temperature (about 90° C.) of the HC adsorbent and the activation temperature (about 300° C.) of the three-way catalyt is incompletely purified solely by the catalyst metal of the HC adsorbent.

Nevertheless, the HC purification efficiency of the conventional cold HC adsorption and removal apparatus is still relatively low. The reason appears to be that since the HC adsorbent is located upstream of the three-way catalyst, the temperature of the HC adsorbent rises quickly to the HC release beginning temperature (90° C.) and begins to release the adsorbed HC before the three-way catalyst is warmed-up to 300° C. to be activated, nor can the released HC be effectively purified by the catalyst metal of the HC adsorbent until the temperature of the catalyst metal of the HC adsorbent reaches about 300° C.

SUMMARY OF THE INVENTION

An object of the invention is to provide a cold HC adsorption and removal apparatus for an internal combustion engine wherein the cold HC adsorption and removal efficiency is greatly increased.

The above object is achieved by a cold HC adsorption and removal apparatus for an internal combustion engine in accordance with the invention. In the apparatus of the invention, an HC adsorbent and a first catalyst, which may be a three-way catalyst or an oxidation catalyst, are installed in an exhaust conduit of an internal combustion engine in that order in the exhaust gas flow direction, and further a second catalyst, which may be a three-way catalyst or an oxidation catalyst, is installed upstream of the HC adsorbent.

In the apparatus according to the present invention, the exhaust gas from the engine flows through the second catalyst first and then flows to the HC adsorbent.

During a cold period immediately after engine start, the thermal energy of the exhaust gas is transferred to the second catalyst. As a result, the temperature of the exhaust gas decreases when the exhaust gas passes through the second catalyst, until the second catalyst is warmed-up to the activation temperature. Thus, the temperature of the HC adsorbent remains low for a relatively long period of time until the second catalyst has been warmed-up, and the HC adsorbent can adsorb the HC included in the exhaust gas for a relatively long time.

After the second catalyst has been warmed-up, the HC included in the exhaust gas is oxidized by the second catalyst. As a result, the HC concentration of the exhaust gas at the inlet of the HC adsorbent is low so that the HC adsorbent can continue to adsorb the HC without becoming saturated by HC.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
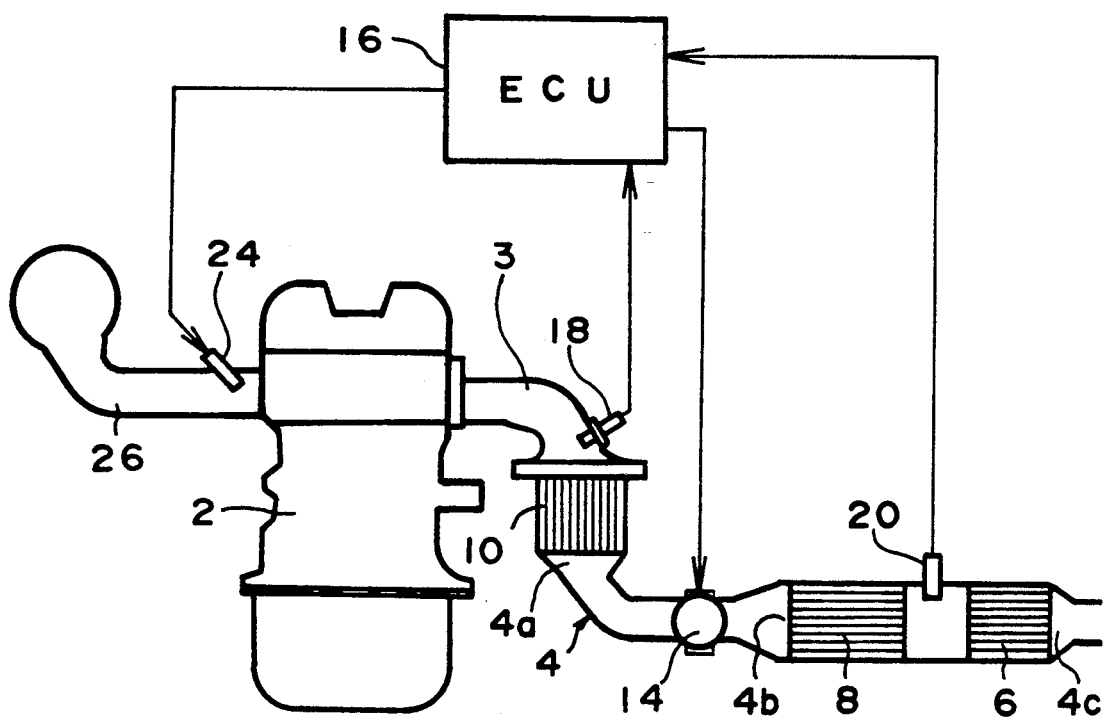
FIG. 1 is a schematic and elevational system diagram of a cold HC adsorption and removal apparatus for an internal combustion engine in accordance with a first embodiment of the present invention.
Figure 2:
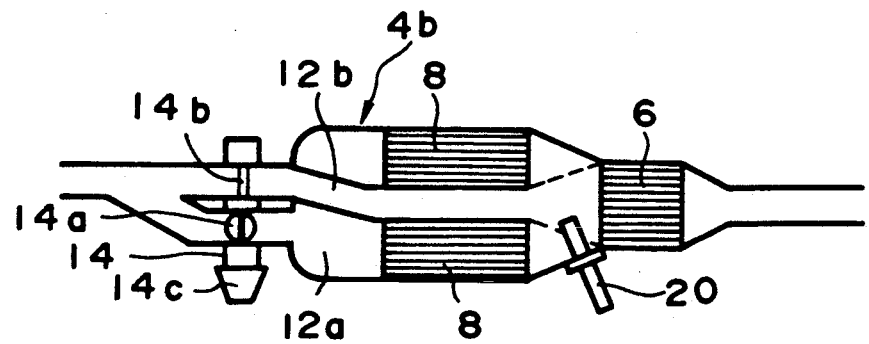
FIG. 2 is a schematic and plan system diagram of the apparatus of FIG. 1.

FIGS. 1 to 6 illustrate a cold HC adsorption and removal apparatus for an internal combustion engine in accordance with a first embodiment of the invention. As illustrated in FIGS. 1 and 2, the apparatus includes an internal combustion engine 2 having an exhaust manifold 3 and an exhaust conduit 4 connected to the exhaust manifold. The exhaust conduit 4 includes an upstream portion 4a located close to the exhaust manifold 3, an intermediate portion 4b, and a downstream portion 4c which are arranged in series in that order in an exhaust gas flow direction.

A first catalyst 6 for oxidizing HC and CO included in exhaust gas from the engine 2 is installed in the downstream portion 4c of the exhaust conduit 4. The first catalyst 6 is composed of a three-way catalyst or an oxidation catalyst. The activation temperature of the first catalyst 6 is in a range of about 250° C.-300° C. (for example, 300° C.).

An HC adsorbent 8 for adsorbing HC included in the exhaust gas from the engine 2 at relatively low temperatures and releasing the adsorbed HC at relatively high temperatures is installed in the intermediate portion 4b of the exhaust conduit 4. More particularly, the HC adsorbent 8 includes a monolithic carrier constructed of cordierite and zeolite coated onto the cordierite. Such an HC adsorbent including zeolite adsorbs HC at temperatures below about 90° C. (90° C.-100° C.), measured at an outlet of the HC adsorbent, and releases the adsorbed HC at temperatures equal to or above about 90° C. (90° C.-100° C.), measured at the outlet of the HC adsorbent. The HC adsorbent 8 may further include a noble metal carried by the cordierite/zeolite carrier.

A second catalyst 10 is installed in the upstream portion 4a of the exhaust conduit 4. The second catalyst 10 is also composed of a three-way catalyst or an oxidation catalyst. Since the second catalyst 10 is located upstream of the HC adsorbent 8 and the first catalyst 6, the second catalyst 10 is warmed-up more quickly than the HC adsorbent 8 and the first catalyst 6 in a period immediately after a cold engine start. The thermal energy of the exhaust gas passing through the second catalyst 10 is transferred to heat the second catalyst 10 until the second catalyst 10 has been activated. As a result, the upstream location of the second catalyst 10 delays the temperature rise of the HC adsorbent 8 during engine warm-up. In addition, after the second catalyst 10 has been warmed-up to temperatures above the activation temperature (which is in a range about 250° C.-300° C.), the second catalyst 10 can purify the HC included in the exhaust gas and decrease the HC concentration of the exhaust gas flowing to the HC adsorbent 8. As a result, the second catalyst 10 also functions to prevent the HC adsorbent 8 from becoming saturated in a short period of time.

Since the upstream portion 4a of the exhaust conduit 4 must be long enough to permit installation of the second catalyst 10 in the upstream portion 4a, the HC adsorbent 8 and the first catalyst 6 are located far away from the engine under the vehicle floor. This underfloor disposition further delays warming-up of the HC adsorbent 8, so that the HC adsorbent 8 can adsorb HC for a still longer time period during engine warm-up. Further, warming-up of the first catalyst 6 is also delayed. However, since the second catalyst 10 located upstream of the first catalyst 6 is quickly warmed-up, the HC can be purified by the second catalyst 10 from the time that the second catalyst 10 has been warmed-up until the first catalyst 6 has been warmed-up. In this manner, the second catalyst 10 operates also as a start catalyst.

In the first embodiment, the intermediate portion 4b is constructed as a dual passage structure having a first passage 12a and a second passage 12b which are parallel to each other. The HC adsorbent 8 is installed in one of the first and second passages 12a and 12b, for example, in the first passage 12a. A switching valve 14 for switching the exhaust gas flow between the first passage 12a and the second passage 12b is installed in the intermediate portion 4b. As shown in FIG. 2, the switching valve 14 includes a first valve body 14a installed in the first passage 12a, a second valve body 14b installed in the second passage 12b, and an actuator for rotating the valve bodies 14a and 14b about the axes thereof. When the first valve body 14a opens the first passage 12a, the second valve body 14b closes the second passage 12b; and when the first valve body 14a closes the first passage 12a, the second valve body 14b opens the second passage 12b.

An actuator 14c of the switching valve 14 is electrically connected to an electronic control unit 16 (a switching valve control means) which is a micro computer. The electronic control unit 16 includes an input and output interface, a central processor unit, a random access memory, and a read-only memory. The electronic control unit 16 is provided with an analog/digital converter for converting analog signals to digital signals. An oxygen sensor 18 is installed in a portion of the exhaust manifold 3 where the branches of the exhaust manifold collect, and a temperature sensor 20 for detecting the exhaust gas temperature is installed at an inlet of the first catalyst 6. The outputs of these sensors 18 and 20 are fed to the electronic control unit via the analog/digital converter. In addition to delivering control signals to the switching valve 14, the electronic control unit also actuates a fuel injector 24 located in an intake conduit 26 of the engine, in a conventional manner.

The switching specification of the switching valve 14 is predetermined as follows:

After the engine starts and before the HC adsorbent 8 begins to release the adsorbed HC (i.e., the exhaust gas temperature at the inlet of the first catalyst 6 reaches 90° C.), the switching valve 14 is in a position to cause the exhaust gas to flow through the HC adsorbent 8 (valve body 14a open and valve body 14b shut). In this period, the cold HC included in the exhaust gas is adsorbed by the HC adsorbent 8.

The volume of the second catalyst 10 is predetermined so that just when the HC adsorbent 8 begins to release the adsorbed HC, the second catalyst 10 has just been activated. When the HC adsorbent 8 begins to release the adsorbed HC, the switching valve 14 is switched (valve body 14a shut and valve body 14b open) to cause the exhaust gas to flow through the second passage 12b (a bypass passage) so that warming-up of the first catalyst 6 is promoted. In this period, the cold HC included in the exhaust gas is purified by the second catalyst 10 which has been activated.

When the temperature of the exhaust gas at the inlet of the first catalyst 6 reaches 300° C., at least an upstream portion of the first catalyst 6 has been warmed-up and activated. At that time, the switching valve 14 is returned to valve body 14a open and valve body 14b shut to cause the exhaust gas to flow through the HC adsorbent 8 for a predetermined time period (for example, two minutes) so that the adsorbed HC is released from the HC adsorbent 8 and the HC adsorbent 8 is recovered to an original condition. The released HC is purified by the first catalyst 6 which has been at least partially activated. After the predetermined time period (for example, two minutes), the switching valve 14 is switched back to valve body 14a shut and valve body 14b open, to cause the exhaust gas to flow through the second passage 12b.

Figure 3:
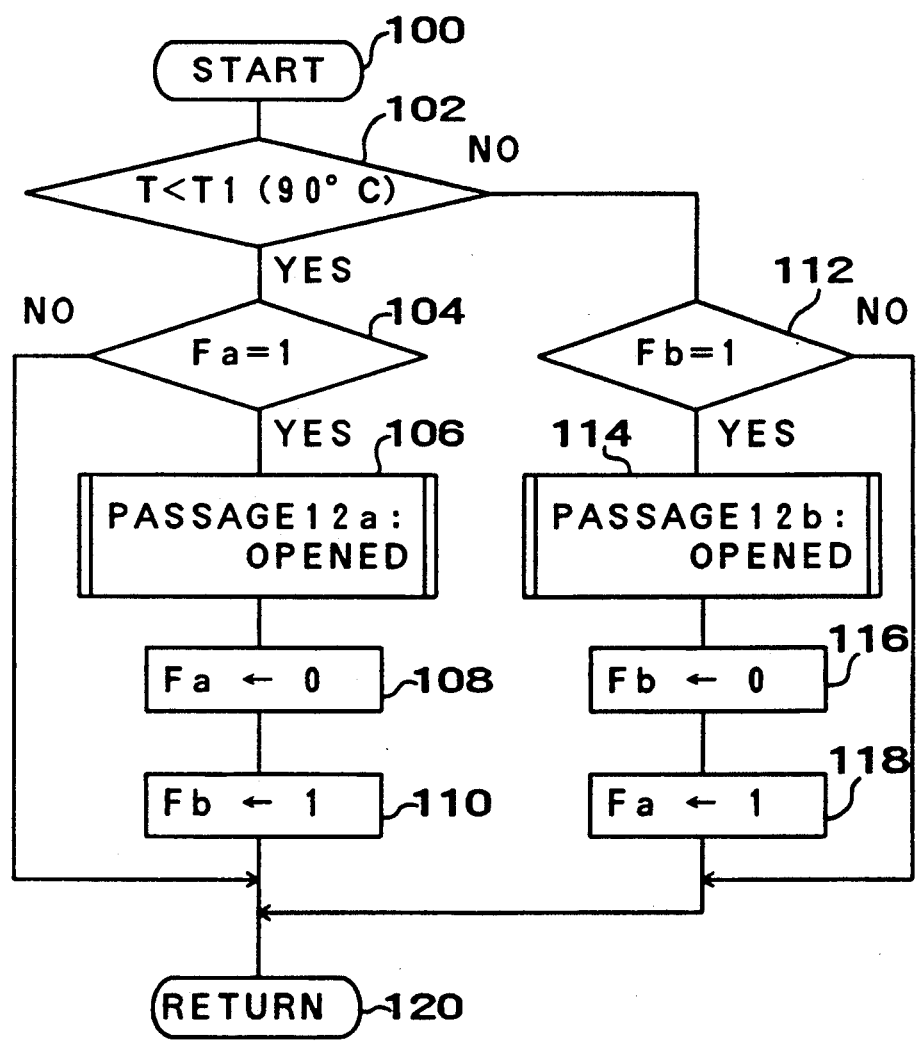
FIG. 3 is a flow chart for control of a switching valve of the apparatus of FIG. 1.
Figure 4:
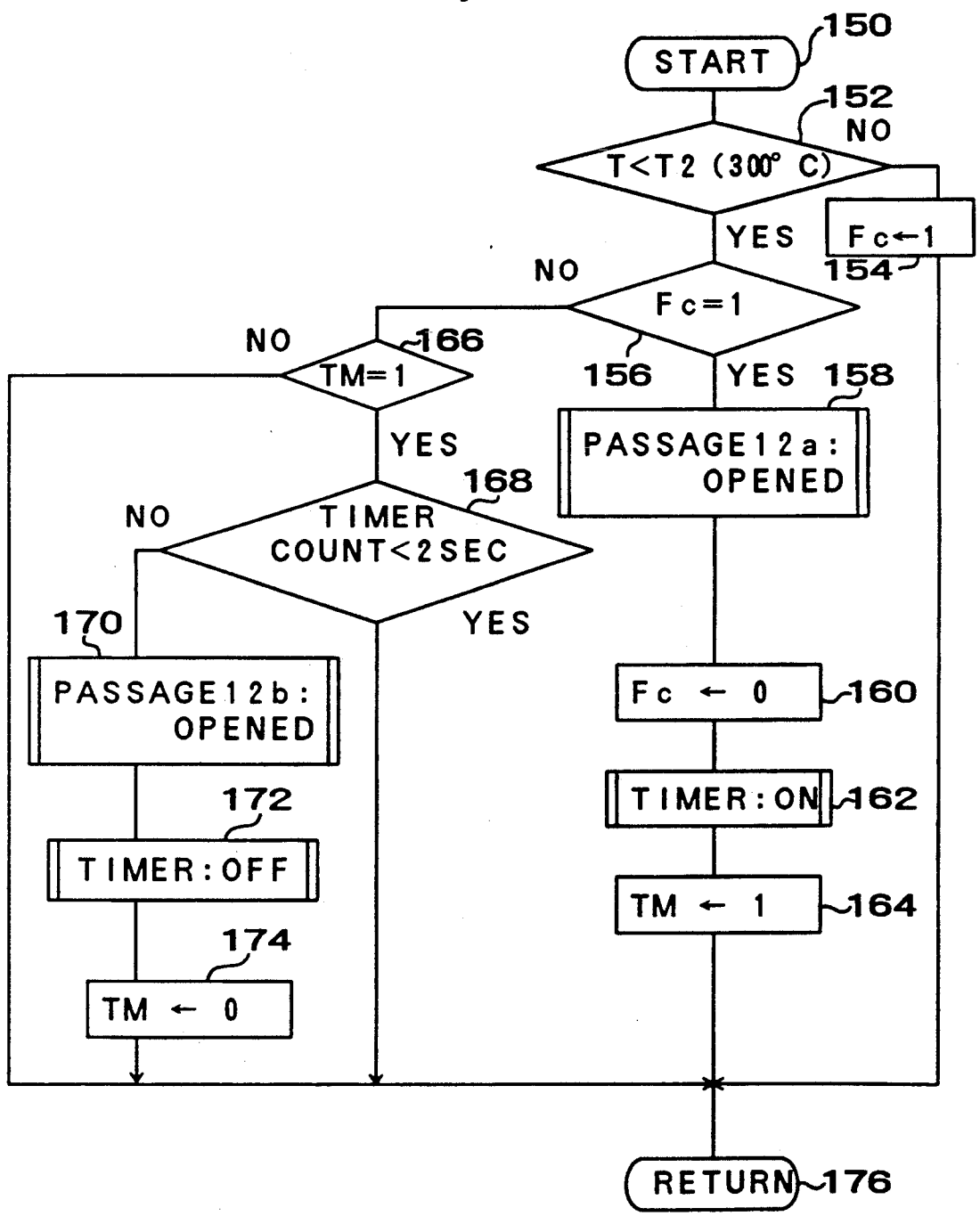
FIG. 4 is another flow chart for control of the switching valve of the apparatus of FIG. 1.

To execute the above-described control, control routines shown in FIGS. 3 and 4 are stored in the read-only memory and are called out by the central processor unit where steps in accordance with the control routines are executed.

The routine of FIG. 3 is entered at step 100 at predetermined time intervals (for example, at 8 msec intervals). Then, at step 102, it is determined whether the present exhaust gas temperature T at the inlet of the first catalyst 6 is lower than a first predetermined temperature T1 (a temperature at which the HC adsorbent 8 begins to release the adsorbed HC, for example, 90° C.). If T is smaller than T1, the engine operation is in a cold condition and is operated at rich air-fuel ratios. In that period, since the second catalyst 10 has not yet been activated, the switching valve 14 should be switched so as to cause the exhaust gas to flow through the HC adsorbent 8 so that the cold HC is adsorbed by the HC adsorbent 8. Thus, the routine proceeds to step 104, where it is determined whether flag Fa is set at "1". If flag Fa is set at "1", the first passage 12a has not been opened. Thus, the routine proceeds to step 106 and the switching valve 14 is switched so as to open the first passage 12a. Then, at step 108, flag Fa is set to "0" and flag Fb is set to "1". Then, the routine proceeds to step 120 where the cycle ends. In the successive cycles, since flag Fa has been set to "0" in the previous cycle, the routine proceeds from step 104 to step 120, skipping steps 106, 108, and 110. Thus, the open condition of the first passage 12a is maintained.

When a period of a few minutes has elapsed after engine start and the temperature T reaches the predetermined temperature T1 (for example, 90° C.), the second catalyst 10 will have been activated and the HC adsorbent 8 will begin to release the adsorbed HC. If it is determined that T is equal to or greater than T1 at step 102, the routine proceeds to step 112, where it is determined whether flag Fb is set at "1". In the first cycle passing the route including step 112, the routine proceeds to step 114, because flag Fb has been set to "1" at step 110 in the previous cycle. At step 114, the switching valve 14 is switched so as to cause the exhaust gas to flow through the second passage 12b. Then, at step 116, flag Fb is set to "0", and at step 118, flag Fa is set to "1". Then, the routine proceeds to step 120 where the cycle ends. In the next cycle, when the routine proceeds to step 112, the routine proceeds from step 112 to step 120, skipping steps 114, 116, and 118, because flag Fb has been set to "0" in the previous cycle. Thus, the open condition of the second passage 12b is maintained.

After completion of the routine of FIG. 3, the routine of FIG. 4 is entered at step 150. Then, at step 152, it is determined whether the temperature T measured at the inlet of the first catalyst 6 is equal to or greater than a second predetermined temperature T2 (an activation temperature of the first catalyst 6, for example, 300° C.). When T is less than T2, the routine proceeds to step 154, where flag Fc is set to "1". Then, the routine proceeds to step 176 where the cycle ends. As a result, the condition determined by the routine of FIG. 3 is maintained.

If T exceeds T2 (for example, 300° C.) at step 152, the routine proceeds to step 156 where it is determined whether flag Fc is set at "1". If the cycle is the first cycle to pass through the route including step 156, flag Fc has been set to "1" in the previous cycle. So, the routine proceeds to step 158, where the switching valve 14 is switched to cause the exhaust gas to flow through the first passage 12a. Then, at step 160, flag Fc is set to "0". Then, the routine proceeds to step 162, where a timer for counting a period since the switching of the switching valve 12 at step 158 is set to "ON". Then, at step 164, timer flag TM is set to "1". Then, at step 176, the cycle ends.

In the successive cycles, the routine proceeds from step 156 to step 168 via step 166, because flag Fc has been set to "1" and flag TM has been set to "1" in the previously described cycle. At step 168, it is determined whether the time period counted by the timer is less than a predetermined period (for example, two seconds) which is a period necessary to purge the HC adsorbed by the HC adsorbent 8. If the time period is less than the predetermined period, the HC adsorbent 8 has not yet been purged, so that the routine proceeds to step 176 and the open condition of the first passage 12a is maintained. If the time period counted by the timer exceeds the predetermined period, the HC adsorbent 8 has been recovered. So, the routine proceeds to step 170, where the switching valve 14 is switched to cause the exhaust gas to flow through the second passage 12b. Then, at step 172, the timer is switched to "OFF" and the timer count time is cleared. Then, at step 174, flag TM is set to "0". Then, the routine proceeds to step 176, where the cycle ends.

Operation of the first embodiment will now be explained with reference to FIGS. 5 and 6.

An HC adsorption characteristic of the apparatus of the invention having the second catalyst 10 and that of a conventional apparatus having no second catalyst were obtained by tests for comparison. The test results are shown in FIG. 5. Further, a temperature increase characteristic at the outlet of the HC adsorbent 8 of the apparatus having the second catalyst 10 and that of the conventional apparatus having no second catalyst were obtained by tests for comparison. The results are shown in FIG. 6. In FIGS. 5 and 6, full lines correspond to the apparatus of the invention and broken lines correspond to the conventional apparatus. The tests were executed under no feed-back control with respect to the air-fuel ratio.

Figure 5:
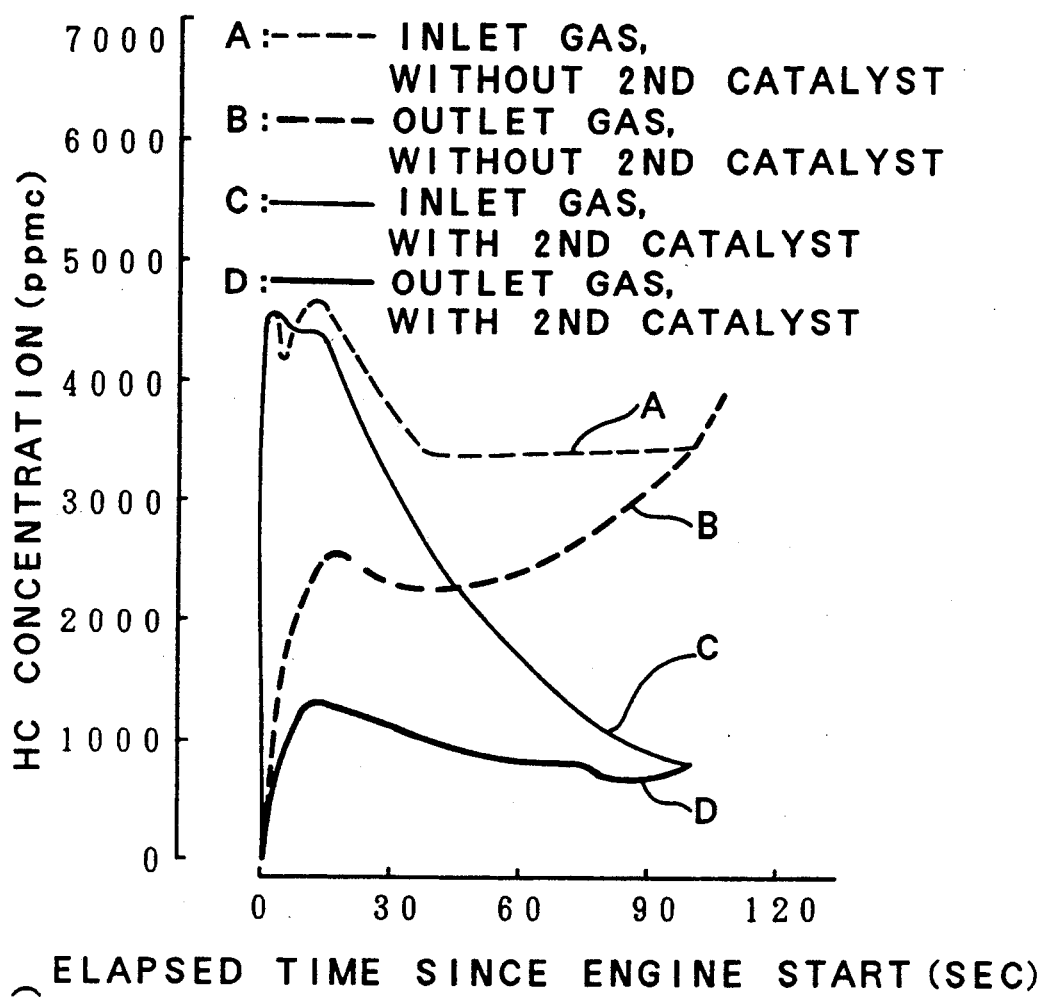
FIG. 5 is a graphical comparison of relationships between HC concentration and elapsed time since engine start-up, for the apparatus of the present invention and for a conventional apparatus.

As shown by line B in FIG. 5, with the conventional apparatus having no second catalyst, the amount of HC measured at the outlet of the HC adsorbent increased rapidly in the period immediately after engine start. This means that the HC adsorption efficiency of the conventional apparatus is low. In contrast, in the apparatus of the invention having the second catalyst, the amount of HC measure at the outlet of the HC adsorbent 8 was small as shown by line D in FIG. 5, and the HC adsorption condition continued for almost two minutes, as shown by a difference between lines C and D in FIG. 5. This means that the HC adsorption and removal efficiency of the apparatus having the second catalyst 10 is high.

The reasons why the HC adsorption and removal efficiency of the apparatus including the second catalyst 10 was increased compared to that of the comparison apparatus are as follows:

One is that the efficiency was improved by delaying the increase in temperature of the HC adsorbent. FIG. 6 illustrates change in temperature of the exhaust gas at the outlet of the HC adsorbent. As seen from FIG. 6, the temperature of the HC adsorbent in the apparatus having no second catalyst increased rapidly in the period immediately after the engine start, while the temperature of the HC adsorbent in the apparatus having the second catalyst increased slowly. This difference depended on the heat capacity of the second catalyst 10. More particularly, since the second catalyst 10 had not yet been activated in the period immediately after the engine start, only an endothermic reaction occurred in the second catalyst. Therefore, the thermal energy of the exhaust gas was transferred to increasing the temperature of the second catalyst 10 and the temperature of the exhaust gas at the outlet of the second catalyst 10 decreased. As a result, the temperature of the exhaust gas at the inlet of the HC adsorbent 8 was relatively low at first, and the temperature of the HC adsorbent 8 remained low for a relatively long time so that the HC adsorbent 8 continued to adsorb most of the HC included in the exhaust gas.

Another reason is that the second catalyst prevented the adsorbed HC from exceeding the adsorption capacity of the HC adsorbent in a short period of time. In the apparatus having no second catalyst, the amount of HC included in the exhaust gas flowing into the HC adsorbent was relatively large even after the engine operation had entered the stoichiometric feed-back control range. As a result, the amount of HC adsorbed by the HC adsorbent exceeded the capacity of the HC adsorbent in a very short period of time. In contrast, in the apparatus having the second catalyst 10, after the second catalyst had been warmed-up to the activation temperature, the HC concentration of the exhaust gas flowing into the HC adsorbent decreased from 5,000 ppm–10,000 ppm to less than about 1,000 ppm (to about 10 ppm, after start of air-fuel ratio feed-back control). As a result, the HC adsorption capacity of the HC adsorbent 8 was sufficient and the HC adsorbent could continue to adsorb HC for a relatively long period of time.

As will be understood from the above tests, the second catalyst 10 delays an increase in the temperature of the HC adsorbent 8 during a cold engine start period and suppresses the HC release rate of the HC adsorbent 8 for a relatively long period. Further, after the engine operation has entered the air-fuel ratio feed back control, the second catalyst 10 decreases the amount of HC included in the exhaust gas flowing into the HC adsorbent 8. As a result of these functions of the second catalyst 10, the HC adsorption and removal efficiency of the apparatus is improved to a great extent.

Before the HC adsorbent 8 has been warmed-up to the HC release beginning temperature, the HC included in the exhaust gas is adsorbed by the HC adsorbent 8.

When the HC adsorbent has been warmed-up to the HC release beginning temperature, the switching valve 14 is switched to the second passage side. Since the second catalyst 10 has been warmed-up by that time, the HC included in the exhaust gas is purified by the second catalyst 10 even before the first catalyst 6 has been warmed-up.

After the first catalyst 6 has been warmed-up, the HC included in the exhaust gas is purified by both the first catalyst 6 and the second catalyst 10. As a result, both in a cold engine start period and in a warmed-up period, exhaust of HC to atmosphere is effectively suppressed. After warm-up, the HC adsorbent 8 is recovered by causing the exhaust gas to flow through the adsorbent in the first passage 12a for a predetermined period.

Figure 7:
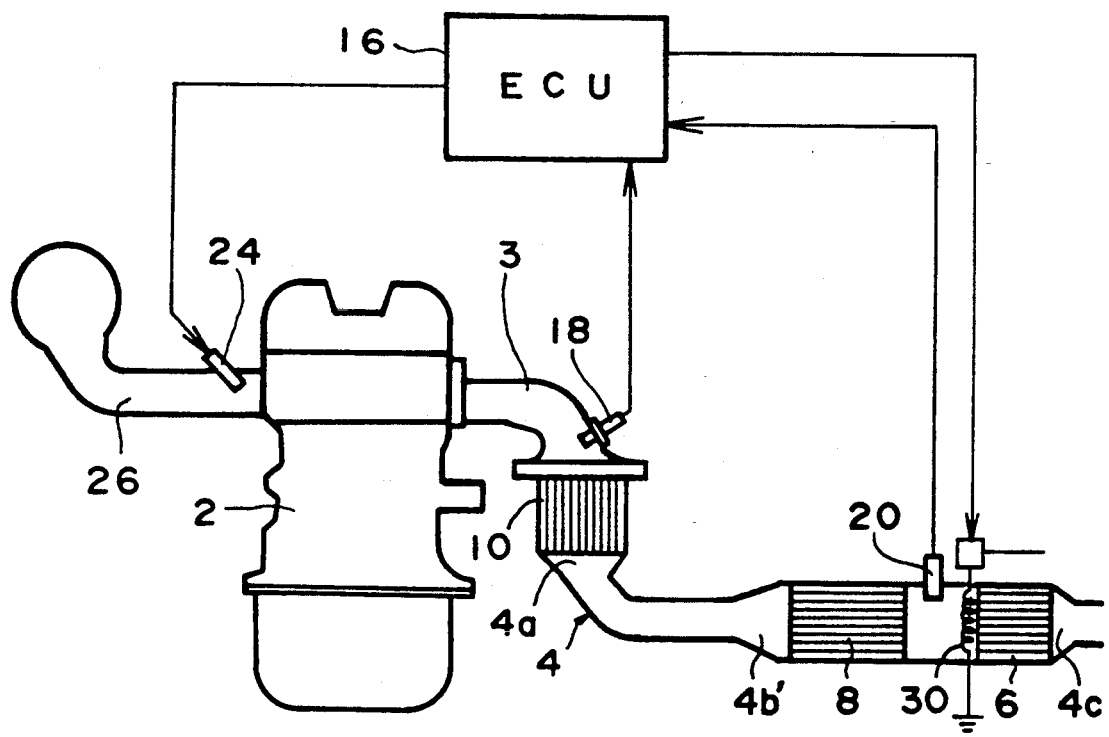
FIG. 7 is a schematic and elevational system diagram of a cold HC adsorption and removal apparatus for an internal combustion engine in accordance with a second embodiment of the present invention.
Figure 8:
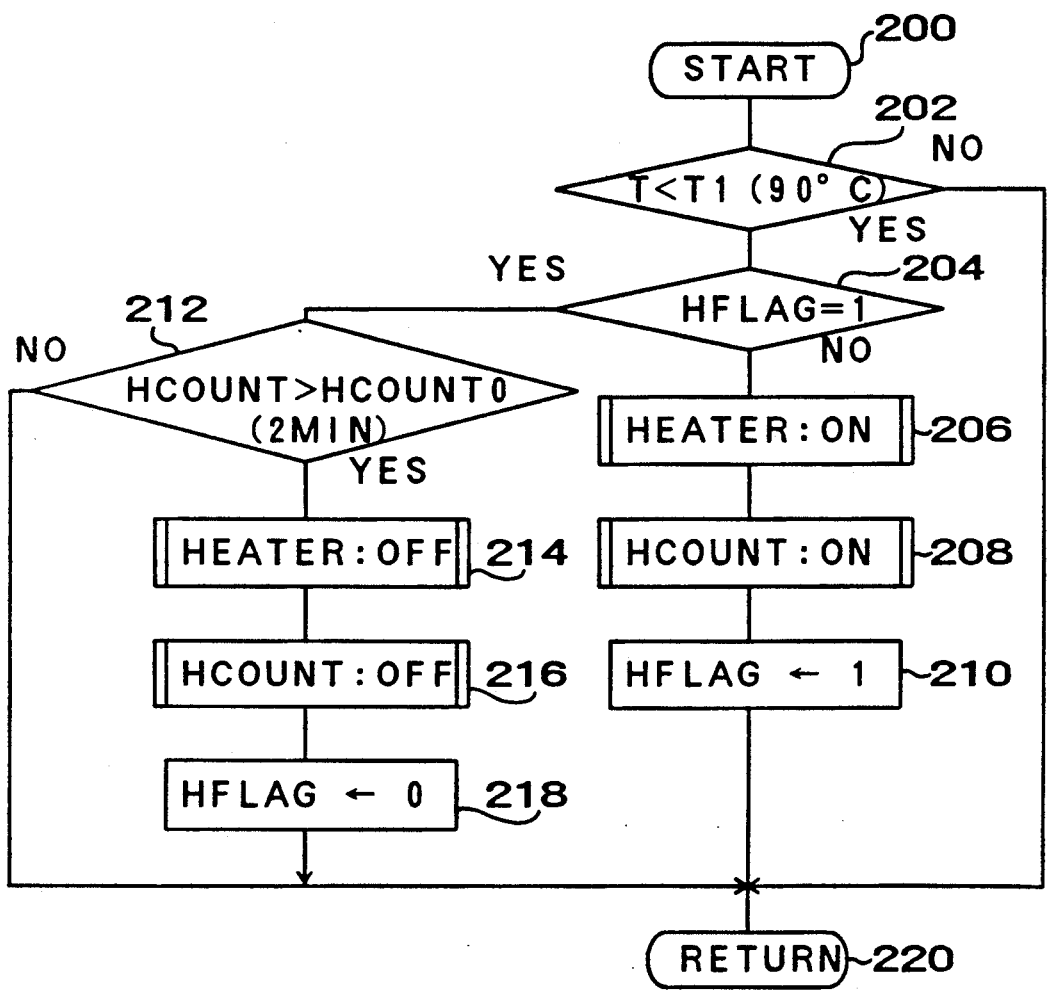
FIG. 8 is a flow chart for control of a heater of the apparatus of FIG. 7.

FIGS. 7 and 8 illustrates a cold HC adsorption and removal apparatus and control therefor in accordance with a second embodiment of the invention. The second embodiment differs from the first embodiment only in that an intermediate portion 4b' of the exhaust conduit is constructed as a single passage structure, so no switching valve is provided ahead of the intermediate portion 4b', and in that a heater 30 for heating the first catalyst 6 in a cold engine start period is provided. Since the remaining portions are the same as those of the first embodiment, these portions are denoted with the same reference numerals as those of the first embodiment.

In the second embodiment, the heater 30 is disposed at an upstream portion of the first catalyst 6. The heater 30 is switched to "ON" when the engine starts, so that the first catalyst 6 becomes activated by the time or just before the HC adsorption catalyst 8 has been warmed-up to the HC release beginning temperature.

FIG. 8 illustrates the control routine of the heater 30. The routine is entered at step 200 at predetermined period intervals. Then, at step 202, it is determined whether the present condition is a cold engine start period, by determining whether the present exhaust gas temperature T is greater than a predetermined temperature T0 (for example, 90° C.). If the engine is not in a cold start condition, heating of the first catalyst 6 by the heater 30 is not necessary and the routine proceeds to step 220 where the cycle ends. If T is less than T0, the engine is in a cold condition. In that period, the cold HC is adsorbed by the HC adsorbent 8. However, before the HC adsorbent has been warmed-up to the HC release beginning temperature, the first catalyst 6 should be brought into a warmed-up condition. Thus, the routine proceeds to step 204, where it is determined whether flag HFLAG is set at "1". If HFLAG is set at "1", the heater 30 is not yet switched to "ON". So, the routine proceeds to step 206, where the heater 30 is switched to "ON", and then at step 208, the timer is switched to "ON" to count the period in which the heater is in an "ON" condition. Then, at step 210, HFLAG is set to "1", and then the routine proceeds to step 220 where the cycle ends.

In the successive cycles, the routine proceeds from step 204 to step 212, because HFLAG has been set to "1" as described above. At step 212, it is determined whether the time period HCOUNT counted by the timer exceeds a predetermined period HCOUNT0 (for example, two minutes). If HCOUNT is equal to or less than HCOUNT0, the first catalyst 6 has not yet been warmed-up and the routine proceeds to step 220, skipping the steps 214, 216, and 218. At step 220, the cycle ends. If HCOUNT exceeds HCOUNT0 at step 212, the first catalyst 6 has been warmed-up and the heater 30 may be switched to "OFF". At that time, the routine proceeds to step 214 where the heater 30 is switched to "OFF", and then, at step 216, the timer is switched to "OFF" and the counted time HCOUNT is cleared. Then, at step 218, flag HFLAG is set to "1", and at step 220, the cycle ends.

Figure 6:
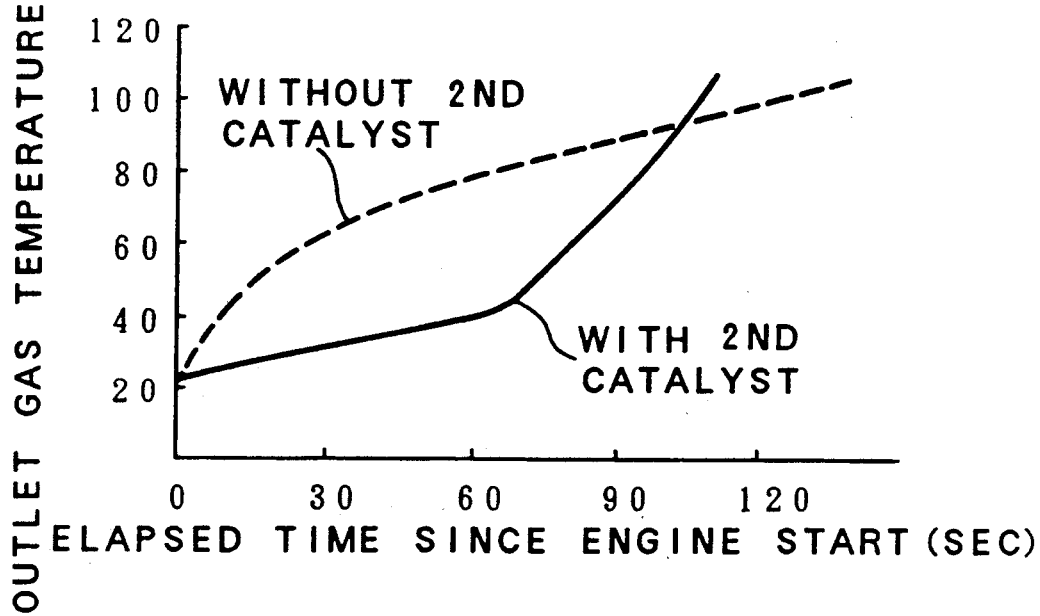
FIG. 6 is a graphical comparison of relationships between exhaust gas temperature at an outlet of an HC adsorbent and elapsed time since engine start-up, for the apparatus of the present invention and for a conventional apparatus.

In the second embodiment, the characteristics similar to FIGS. 5 and 6 are obtained.

In accordance with the invention, since the second catalyst is disposed upstream of the HC adsorbent, increase in the temperature of the HC adsorbent in a period immediately after a cold engine start is delayed. As a result, the HC adsorbent adsorbs the HC included in the exhaust gas for a relatively long time. Further, after the second catalyst has been activated, the HC concentration of the exhaust gas flowing into the HC adsorbent is decreased, and the HC adsorbent does not become saturated by the HC for a long time. As a result, exhaust of the HC included in the exhaust gas to atmosphere is effectively suppressed.

Although two embodiments of the invention have been described in detail above, it will be appreciated by those skilled in the art that various modifications and alterations can be made to the particular embodiments shown without materially departing from the novel teaching and advantages of the present invention. Accordingly, it is to be understood that all such modifications and alterations are included within the spirit and scope of the invention as defined by the following claims.

What is claimed is:

1. A cold HC adsorption and removal apparatus for an internal combustion engine comprising:
    an internal combustion engine having an exhaust manifold and an exhaust conduit connected to the exhaust manifold, the exhaust conduit including an upstream portion, an intermediate portion, and a downstream portion arranged in series in that order, wherein the intermediate portion includes a first passage and a second passage arranged in parallel to each other and wherein a switching valve is installed in the intermediate portion for switching exhaust gas flow from the upstream portion between the first passage and the second passage;
    a first catalyst installed in the downstream portion for oxidizing hydrocarbons included in exhaust gas from the internal combustion engine, the first catalyst having a first temperature for activation;
    an HC adsorbent installed in the first passage for adsorbing and releasing the hydrocarbons included in the exhaust gas, the HC adsorbent having a second temperature for beginning to release the hydrocarbons adsorbed by the HC adsorbent, wherein the second temperature is lower than the first temperature, the HC adsorbent adsorbing the hydrocarbons included in the exhaust gas when a temperature of the HC adsorbent is lower than the second temperature and releasing the adsorbed hydrocarbons when the temperature of the HC adsorbent is equal to or higher than the second temperature;
    switching valve control means for operating the switching valve so as to cause the exhaust gas to flow through the first passage when the temperature of the HC adsorbent is lower than the second temperature and to cause the exhaust gas to flow through the second passage when the temperature is equal to or higher than the second temperature, wherein the switching valve control means is adapted to further operate the switching valve so as to cause the exhaust gas to flow through the first passage only for a predetermined time period after the temperature of the first catalyst has reached the first temperature; and
    a second catalyst installed in the upstream portion for oxidizing hydrocarbons included in the exhaust gas, the second catalyst having a temperature for activation substantially equal to the first temperature.

2. An apparatus according to claim 1, wherein the first temperature is in a range of about 250° C.-300° C.

3. An apparatus according to claim 1, wherein the second temperature is in a range of about 90° C.-100° C.

4. An apparatus according to claim 1, wherein the first catalyst is a three-way catalyst.

5. An apparatus according to claim 1, wherein the first catalyst is an oxidation catalyst.

6. An apparatus according to claim 1, wherein the HC adsorbent includes zeolite.

7. An apparatus according to claim 1, wherein the second catalyst is a three-way catalyst.

8. An apparatus according to claim 1, wherein the second catalyst is an oxidation catalyst.

9. An apparatus according to claim 1, wherein the predetermined time period is about two minutes.

10. An apparatus according to claim 1, wherein a volume of the second catalyst is predetermined so that the second catalyst becomes warmed-up to the first temperature no later than the HC adsorbent becomes warmed-up to the second temperature.

11. An apparatus according to claim 1, wherein the first catalyst and the HC adsorbent are disposed under a vehicle floor.

12. A cold HC adsorption and removal apparatus for an internal combustion engine comprising:
    an internal combustion engine having an exhaust manifold and an exhaust conduit connected to the exhaust manifold, the exhaust conduit including an upstream portion, an intermediate portion, and a downstream portion arranged in series in that order, wherein the intermediate portion includes a single passage where the HC adsorbent is installed;
    a first catalyst installed in the downstream portion for oxidizing hydrocarbons included in exhaust gas from the internal combustion engine, the first catalyst having a first temperature for activation;
    a heater disposed at an inlet of the first catalyst;
    an HC adsorbent installed in the intermediate portion for adsorbing and releasing the hydrocarbons included in the exhaust gas, the HC adsorbent having a second temperature for beginning to release the hydrocarbons, adsorbed by the HC adsorbent, wherein the second temperature is lower than the first temperature, the HC adsorbent adsorbing the hydrocarbons included in the exhaust gas when a temperature of the HC adsorbent is lower than the second temperature and releasing the adsorbed hydrocarbons when the temperature of the HC adsorbent is equal to or higher than the second temperature; and
    a second catalyst installed in the upstream portion for oxidizing hydrocarbons included in the exhaust gas, the second catalyst having a temperature for activation substantially equal to the first temperature.

13. An apparatus according to claim 12, further comprising means for switching-on the heater for a predetermined time period before the first catalyst has been warmed-up to the first temperature.

14. An apparatus according to claim 13, wherein the predetermined time period is about two minutes.

* * * * *

UNITED STATES PATENT AND TRADEMARK OFFICE
CERTIFICATE OF CORRECTION

PATENT NO. : 5,315,824
DATED : May 31, 1994
INVENTOR(S) : Shinichi TAKESHIMA It is certified that error appears in the above-identified patent and that said Letters Patent is hereby corrected as shown below:

Column 10, line 46, delete the comma after "hydrocarbons".

Signed and Sealed this

Twenty-second Day of November, 1994

Attest:

BRUCE LEHMAN

*Attesting Officer*  *Commissioner of Patents and Trademarks*